US010771766B2

United States Patent
Wang et al.

(10) Patent No.: US 10,771,766 B2
(45) Date of Patent: Sep. 8, 2020

(54) METHOD AND APPARATUS FOR ACTIVE STEREO VISION

(71) Applicant: MediaTek Inc., Hsinchu (TW)

(72) Inventors: Han-Yang Wang, Hsinchu (TW); Yu-Chun Chen, Hsinchu (TW); Po-Hao Huang, Hsinchu (TW); Chao-Chung Cheng, Hsinchu (TW); Ying-Jui Chen, Hsinchu (TW); Te-Hao Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/359,721

(22) Filed: Mar. 20, 2019

(65) Prior Publication Data

US 2019/0306488 A1    Oct. 3, 2019

Related U.S. Application Data

(60) Provisional application No. 62/650,441, filed on Mar. 30, 2018, provisional application No. 62/654,607, filed on Apr. 9, 2018, provisional application No. 62/658,000, filed on Apr. 16, 2018, provisional application No. 62/771,638, filed on Nov. 27, 2018.

(51) Int. Cl.
*H04N 13/25* (2018.01)
*H04N 5/33* (2006.01)
*H04N 13/254* (2018.01)
*H04N 13/257* (2018.01)

(52) U.S. Cl.
CPC ............... *H04N 13/25* (2018.05); *H04N 5/33* (2013.01); *H04N 13/254* (2018.05); *H04N 13/257* (2018.05)

(58) Field of Classification Search
None
See application file for complete search history.

(56) References Cited

U.S. PATENT DOCUMENTS

| 2008/0143085 | A1* | 6/2008 | Breed | B60R 21/01516 |
| | | | | 280/735 |
| 2008/0234899 | A1* | 9/2008 | Breed | B60N 2/0232 |
| | | | | 701/47 |
| 2016/0360124 | A1* | 12/2016 | Shan | H04N 5/2352 |
| 2017/0341183 | A1* | 11/2017 | Buller | G01B 11/30 |

FOREIGN PATENT DOCUMENTS

TW       M547661 U      8/2017

OTHER PUBLICATIONS

Taiwan Intellectual Property Office, Office Action for Taiwan Patent Application No. 108111193, dated Mar. 13, 2020.

* cited by examiner

*Primary Examiner* — Talha M Nawaz
(74) *Attorney, Agent, or Firm* — Han IP PLLC; Andy M. Han

(57) ABSTRACT

Various examples with respect to method and apparatus for active stereo vision are described. An apparatus may include an electromagnetic (EM) wave emitter, a first sensor and a second sensor. During operation, the EM wave emitter emits EM waves toward a scene, the first sensor captures a first image of the scene in an infrared (IR) spectrum, and the second sensor captures a second image of the scene in a light spectrum. The first image and second image, when processed, may enable active stereo vision.

17 Claims, 10 Drawing Sheets

100

(A)

NOTE

GENERAL INFRARED (GIR) CAMERA MAY BE:
- IR CAMERA
- RGB-IR CAMERA
- RGB-DB CAMERA
- MONO-IR CAMERA
- MONO-DB CAMERA (B)

RGB CAMERA → RGB-IR CAMERA (C)

MONOCHROME CAMERA → MONOCHROME-IR CAMERA

DESIGN 1: RGB CAMERA IS CLOSE TO (ADJACENT TO) MAIN IR CAMERA

DESIGN 3: RGB CAMERA AND MAIN IR CAMERA ARE REPLACED BY A GIR CAMERA TO REDUCE NUMBER OF SENSORS AND MODULE SIZE

DESIGN 1: RGB CAMERA IS CLOSE TO (ADJACENT TO) MAIN IR CAMERA

ADJACENT

500

DESIGN 4: RGB CAMERA AND MAIN IR CAMERA ARE REPLACED BY A GIR CAMERAS TO REDUCE NUMBER OF SENSORS AND MODULE SIZE

NOTE: EITHER OF THE TWO GIR CAMERAS CAN BE THE MAIN CAMERA

DESIGN 1: RGB CAMERA IS CLOSE TO (ADJACENT TO) MAIN IR CAMERA

600

DESIGN 5: TWO IR EMITTERS (FLOODLIGHT / STRUCTURED LIGHT) BECOME ONE IR EMITTER WHICH CAN GENERATE DIFFERENT KINDS OF PROJECTION OVER TIME

DESIGN 1: RGB CAMERA IS CLOSE TO (ADJACENT TO) MAIN IR CAMERA

DESIGN 6: PANEL LIGHT SOURCES (INCLUDING IR) CAN REPLACE FLOODLIGHT IR EMITTER WITHOUT INCREASING MODULE SIZE

DESIGN 1: RGB CAMERA IS CLOSE TO (ADJACENT TO) MAIN IR CAMERA

DESIGN 7: FLOODLIGHT IR EMITTER IS NOT LIMITED TO ANY POSITION OR SHAPE (E.G., CAN BE RING-SHAPED)

METHOD AND APPARATUS FOR ACTIVE STEREO VISION

CROSS REFERENCE TO RELATED PATENT APPLICATION(S)

The present disclosure is part of a non-provisional application claiming the priority benefit of U.S. Patent Application Nos. 62/650,441, 62/654,607, 62/658,000 and 62/771,638, filed on 30 Mar. 2018, 9 Apr. 2018, 16 Apr. 2018 and 27 Nov. 2018, respectively. The contents of aforementioned applications are incorporated by reference in their entirety.

TECHNICAL FIELD

The present disclosure is generally related to computer stereo vision and, more particularly, to a method and apparatus for active stereo vision.

BACKGROUND

Unless otherwise indicated herein, approaches described in this section are not prior art to the claims listed below and are not admitted as prior art by inclusion in this section.

Computer stereo vision is a technology that provides three-dimensional (3D) information from digital images of a scene. By comparing information about the scene from two digital images taken from two vantage points, 3D information can be obtained by comparing relative positions of objects in the two digital images of the scene.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose schemes, solutions, concepts, designs, methods and apparatuses that enable active stereo vision with off-the-shelf and relatively inexpensive components.

In one aspect, an apparatus may include an electromagnetic (EM) wave emitter, a first sensor and a second sensor. During operation, the EM wave emitter emits EM waves toward a scene, the first sensor captures a first image of the scene in an infrared (IR) spectrum, and the second sensor captures a second image of the scene in a light spectrum. The first image and second image, when processed, may enable active stereo vision.

In one aspect, a method may involve controlling an EM wave emitter to emit EM waves toward a scene. The method may also involve receiving, from a first sensor, a first image of the scene in an IR spectrum and receiving, from a second sensor, a second image of the scene in a light spectrum. The method may further involve performing depth estimation using active stereo vision based on the first image and the second image.

It is noteworthy that, although description provided herein may be in the context of certain EM wave spectra and light-emitting topologies such as IR and light-emitting diode (LED), the proposed concepts, schemes and any variation(s)/derivative(s) thereof may be implemented in, for and by other EM wave spectra and/or light-emitting technologies such as, for example and without limitation, laser, light detection and ranging (LiDAR) and time-of-flight (TOF). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Active stereo vision (herein interchangeably referred as "active stereo") is a form of computer stereo vision that actively projects a light (e.g., structured light or laser) onto a scene to allow detection of detailed features on surfaces of objects in the scene. Under a proposed scheme in accordance with the present disclosure, components for active stereo may include at least two sensors, which may be general IR (GIR) cameras, and at least one EM wave emitter. In the present disclosure, the term "GIR camera" may refer to any of the following: (a) a pure IR camera, (b) a red-green-blue (RGB) camera that contains one or more pixels capable of receiving pure IR light, herein referred as "RGB-IR camera", (c) a RGB camera with dual-band bandpass filtering capability for allowing light in the visible spectrum and the IR spectrum to pass through, herein referred as "RGB-DB camera", (d) a monochrome camera that contains one or more pixels capable of receiving pure IR light, herein referred as "mono-IR camera", and (e) a monochrome camera with dual-band bandpass filtering capability for allowing light in the visible spectrum and the IR spectrum to pass through, herein referred as "mono-DB camera." In the present disclosure, the term "EM wave emitter" may refer to one or a combination of two or more of the following: (a) an IR emitter capable of projecting a structured IR light, (b) an IR emitter capable of emitting a floodlight in the IR spectrum, (c) LED light source(s), (d) a display panel capable of emitting LED light and/or IR light to provide floodlighting, and (e) a floodlight IR emitter, which ma be in a ring shape that is mounted around a perimeter of a display panel or frame of an apparatus (e.g., smartphone).

Figure 1:
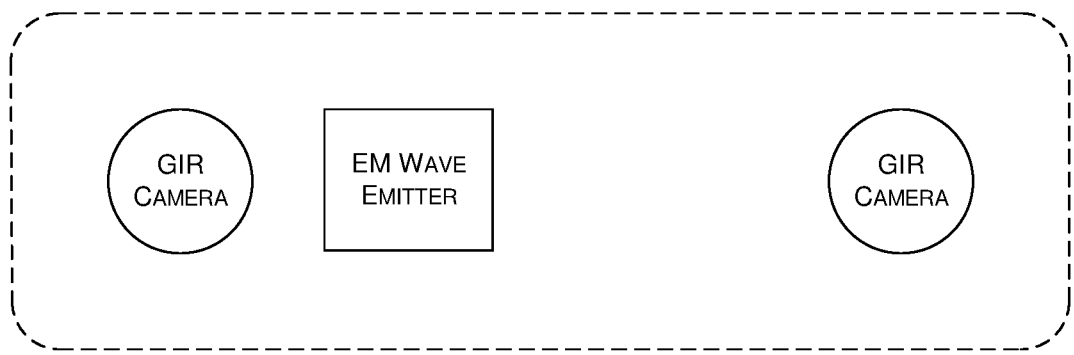
FIG. 1 is a diagram of a general design of components for active stereo in accordance with an implementation of the present disclosure.
Figure 1:
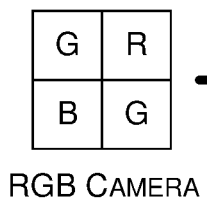
Figure 1:
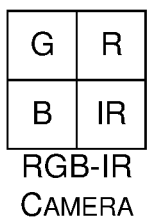
Figure 1:
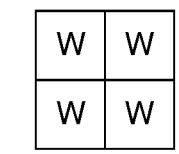
Figure 1:
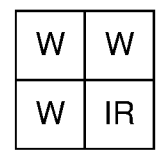

FIG. 1 illustrates an example design of components of an example module 100 for active stereo in accordance with an implementation of the present disclosure. Referring to part (A) of FIG. 1, module 100 may include at least two GIR cameras and one EM wave emitter. Each of the two GIR cameras may be any kind of sensor that is capable of receiving, detecting or otherwise sensing IR light. For instance, each of the two GIR cameras may be a pure IR camera, a RGB-IR camera, a mono-IR camera, a RGB-DB camera or a mono-DB camera. The EM wave emitter may be an IR projector and may be arranged in any position of module 100.

Part (B) of FIG. 1 shows an example of sensors of a RGB camera (labeled as "R", "G", "B" in FIG. 1 to denote sensors capable of sensing light in the red light spectrum, green light spectrum and blue light spectrum, respectively) and sensors of a RGB-IR camera (labeled as "R", "G", "B", "IR" in FIG. 1 to denote sensors capable of sensing light in the red light spectrum, green light spectrum, blue light spectrum and IR light spectrum, respectively). Part (C) of FIG. 1 shows an example of sensors of a monochrome camera (labeled as "W" in FIG. 1 to denote sensors capable of sensing light in the white light spectrum) and sensors of a mono-IR camera (labeled as "W" and "IR" in FIG. 1 to denote sensors capable of sensing light in the white light spectrum and IR light spectrum, respectively).

Figure 2:
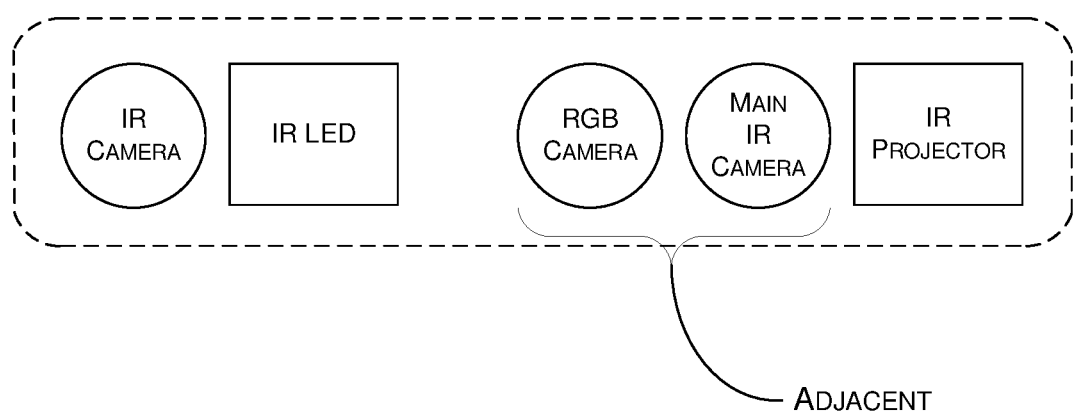
FIG. 2 is a diagram of an example arrangement of components for active stereo in accordance with an implementation of the present disclosure.

FIG. 2 illustrates an example arrangement of components of an example module 200 for active stereo in accordance with an implementation of the present disclosure. Under a first design (or design 1) in accordance with the present disclosure, module 200 may include two IR cameras, one RGB camera, one IR projector and one IR LED. The RGB camera may be arranged in any position of module 200. The IR LED may provide floodlight while the IR projector may project a structured IR light for active stereo. The IR LED and IR projector may be arranged in any position of module 200. One of the two IR cameras may be the main IR camera, the perspective or vantage point of which may be the vantage point ultimately shown on a display panel viewed by a user. The RGB camera and the main IR camera may be close to (i.e., adjacent to) one another.

Figure 3:
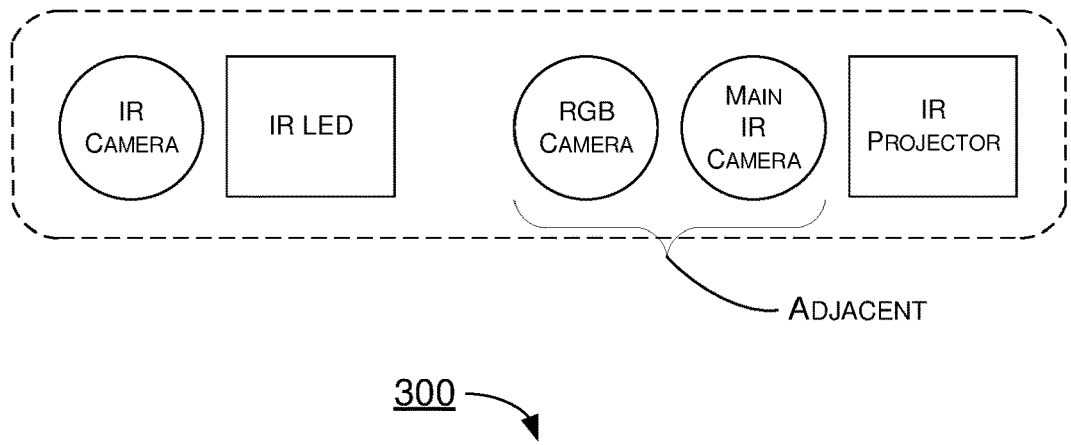
FIG. 3 is a diagram of an example arrangement of components for active stereo in accordance with an implementation of the present disclosure.
Figure 3:
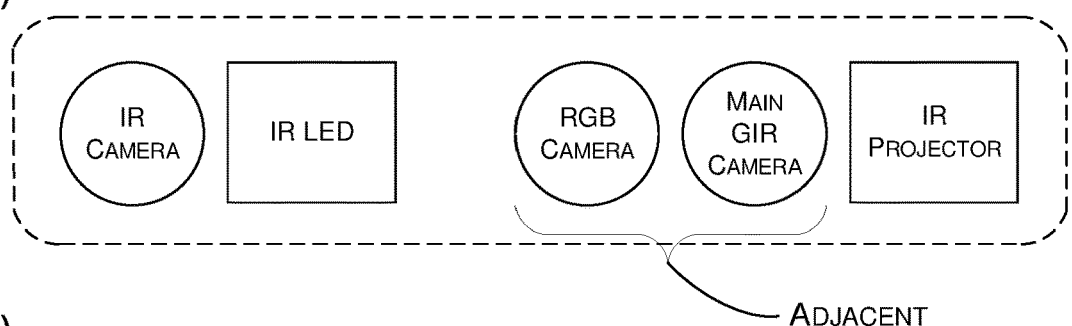
Figure 3:
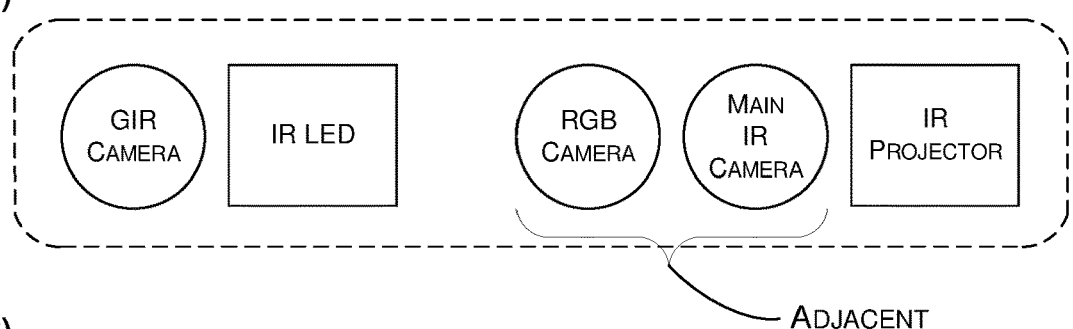
Figure 3:
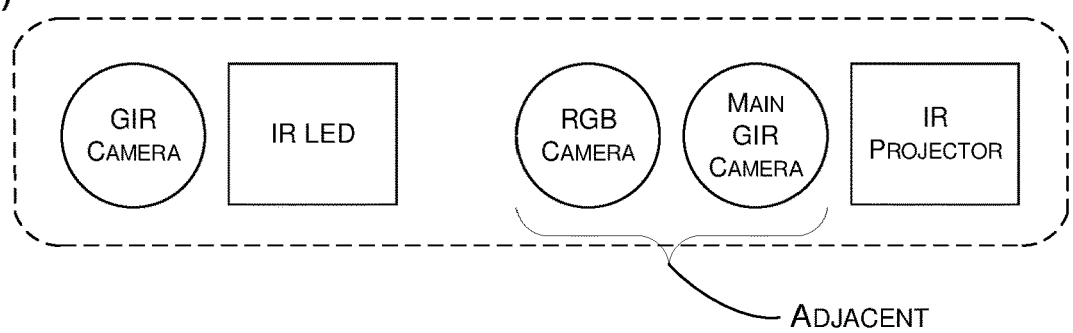

FIG. 3 illustrates an example arrangement of components of an example module 300 for active stereo in accordance with an implementation of the present disclosure. Under a second design (or design 2) in accordance with the present disclosure, IR cameras may be replaced by GIR cameras in module 300. Referring to part (A) of FIG. 3, the main IR camera in design 1 may be replaced by a GIR camera (which functions as a main GIR camera) in design 2. Referring to part (B) of FIG. 3, the IR camera in design 1 that is not the main IR camera may be replaced by a GIR camera in design 2. Referring to part (C) of FIG. 3, each of the two IR cameras in design 1 may be replaced by a respective GIR camera in design 2.

Figure 4:
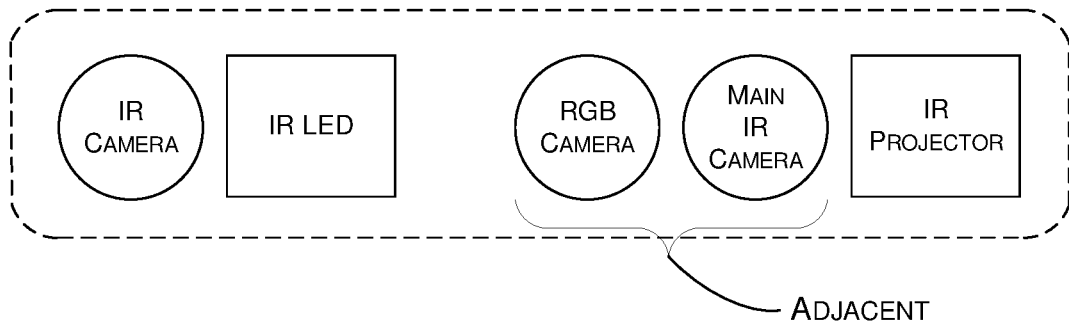
FIG. 4 is a diagram of an example arrangement of components for active stereo in accordance with an implementation of the present disclosure.
Figure 4:
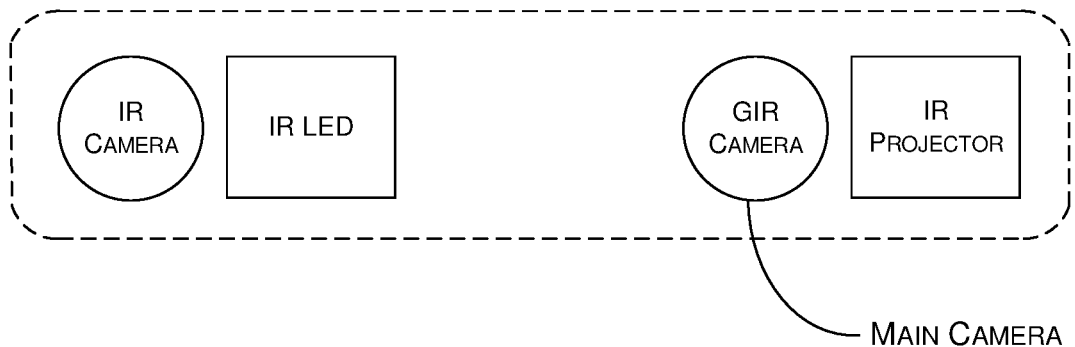

FIG. 4 illustrates an example arrangement of components of an example module 400 for active stereo in accordance with an implementation of the present disclosure. Under a third design (or design 3) in accordance with the present disclosure, compared to design 1, the main IR camera and the RGB camera together may be replaced by a GIR camera. Advantageously, this design may reduce the number of sensors (thereby lowering manufacturing cost) as well as the size of module 400 relative to module 100.

Figure 5:
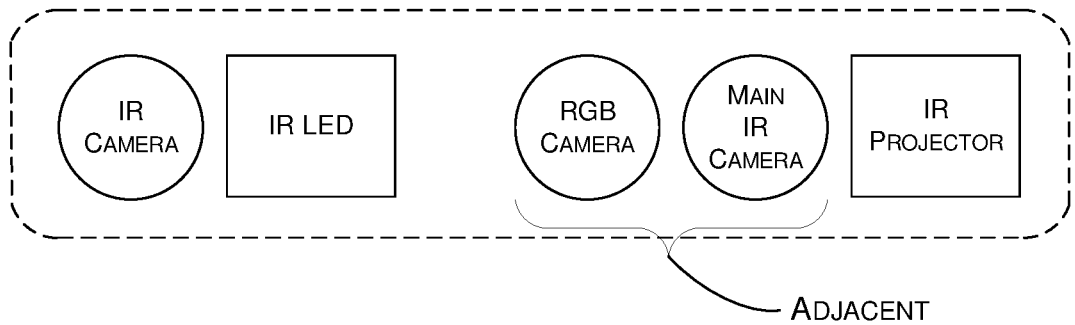
FIG. 5 is a diagram of an example arrangement of components for active stereo in accordance with an implementation of the present disclosure.
Figure 5:

FIG. 5 illustrates an example arrangement of components of an example module 500 for active stereo in accordance with an implementation of the present disclosure. Under a fourth design (or design 4) in accordance with the present disclosure, compared to design 1, the main IR camera and the RGB camera together may be replaced by a GIR camera. Additionally, the other IR camera may also be replaced by another GIR camera. In design 4, with dual GIR cameras for active stereo, either of the two GIR cameras may function as the main camera. Advantageously, this design may reduce the number of sensors (thereby lowering manufacturing cost) as well as the size of module 500 relative to module 100.

Figure 6:
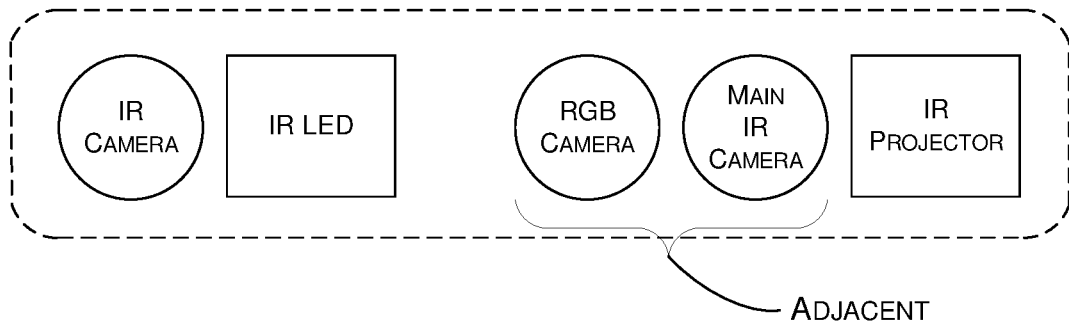
FIG. 6 is a diagram of an example emitter configuration for active stereo in accordance with an implementation of the present disclosure.
Figure 6:
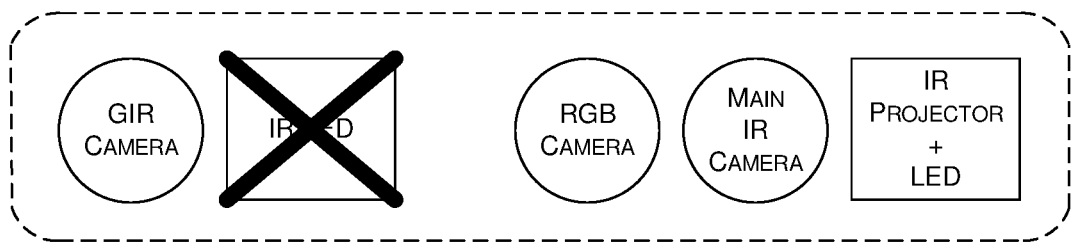

FIG. 6 illustrates an example emitter configuration of an example module 600 for active stereo in accordance with an implementation of the present disclosure. Under a fifth design (or design 5) in accordance with the present disclosure, compared to design 1, a single EM wave emitter in design 5 may replace the two components of IR projector and IR LED in design 1. That is, in design 5, the EM wave emitter may function as an IR projector, when operating in a first mode, and as an IR LED, when operating in a second mode. When functioning as an IR projector, the EM wave emitter may project a structured light toward a scene. When functioning as an IR LED, the EM wave emitter may emit IR floodlight. Thus, the EM wave emitter may generate different kinds of projection or emission over time (e.g., alternatingly).

Figure 7:
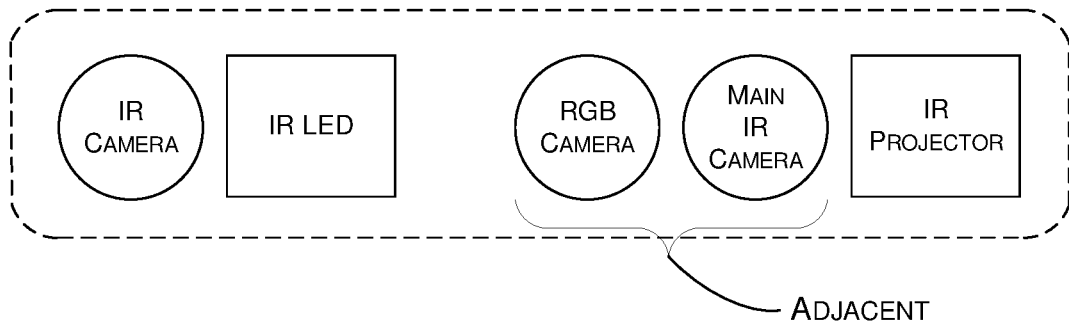
FIG. 7 is a diagram of an example emitter configuration for active stereo in accordance with an implementation of the present disclosure.
Figure 7:
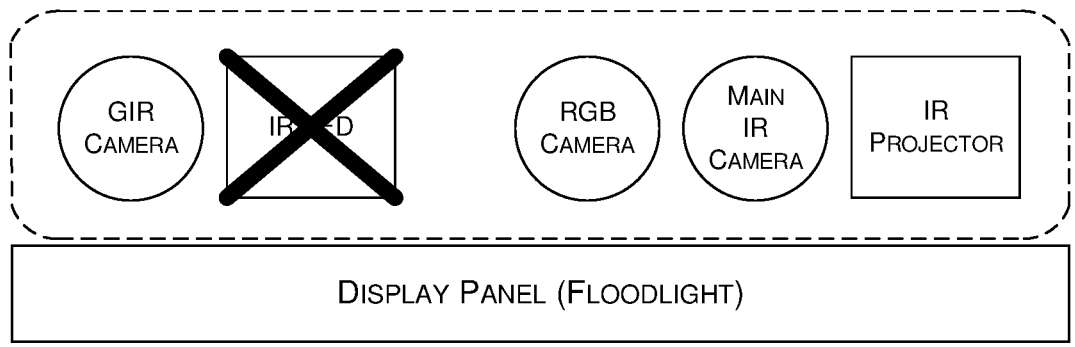

FIG. 7 illustrates an example emitter configuration of an example module 700 for active stereo in accordance with an implementation of the present disclosure. Under a sixth design (or design 6) in accordance with the present disclosure, compared to design 1, a display panel in design 6 may be utilized to emitting an IR floodlight and thereby eliminate the need of the IR LED. That is, light source(s) in the display panel may include IR light source(s) to provide floodlight. This design would not result in increase in the size of module 700 relative to module 100.

Figure 8:
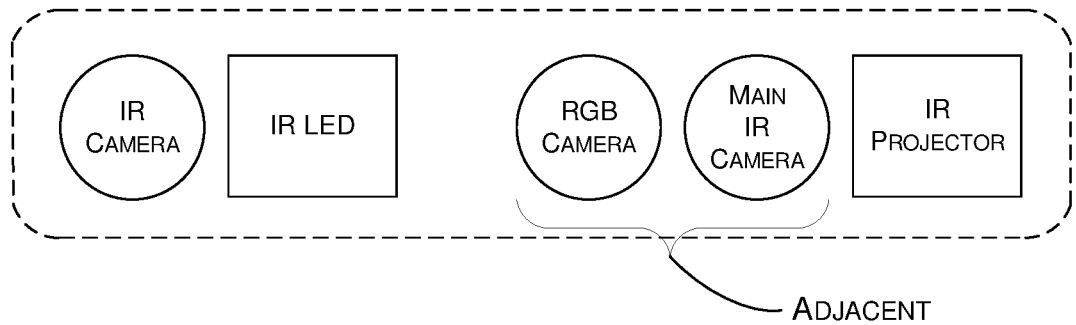
FIG. 8 is a diagram of an example emitter configuration for active stereo in accordance with an implementation of the present disclosure.
Figure 8:
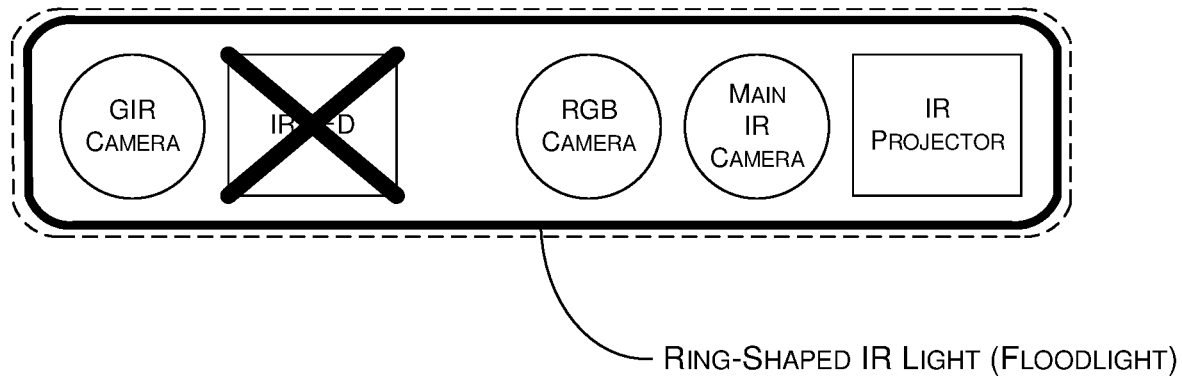

FIG. 8 illustrates an example emitter configuration of an example module 800 for active stereo in accordance with an implementation of the present disclosure. Under a seventh design (or design 7) in accordance with the present disclosure, compared to design 1, the IR floodlight emitter may take on a different position and/or appearance (or shape). For instance, as shown in FIG. 8, the IR LED in design 1 may be replaced by a ring-shaped IR light in design 7. The ring-shaped IR light may be disposed around a perimeter of module 800 to surround or otherwise encircle the two IR cameras (or GIR cameras), RGB camera and IR projector.

Illustrative Implementations

Figure 9:
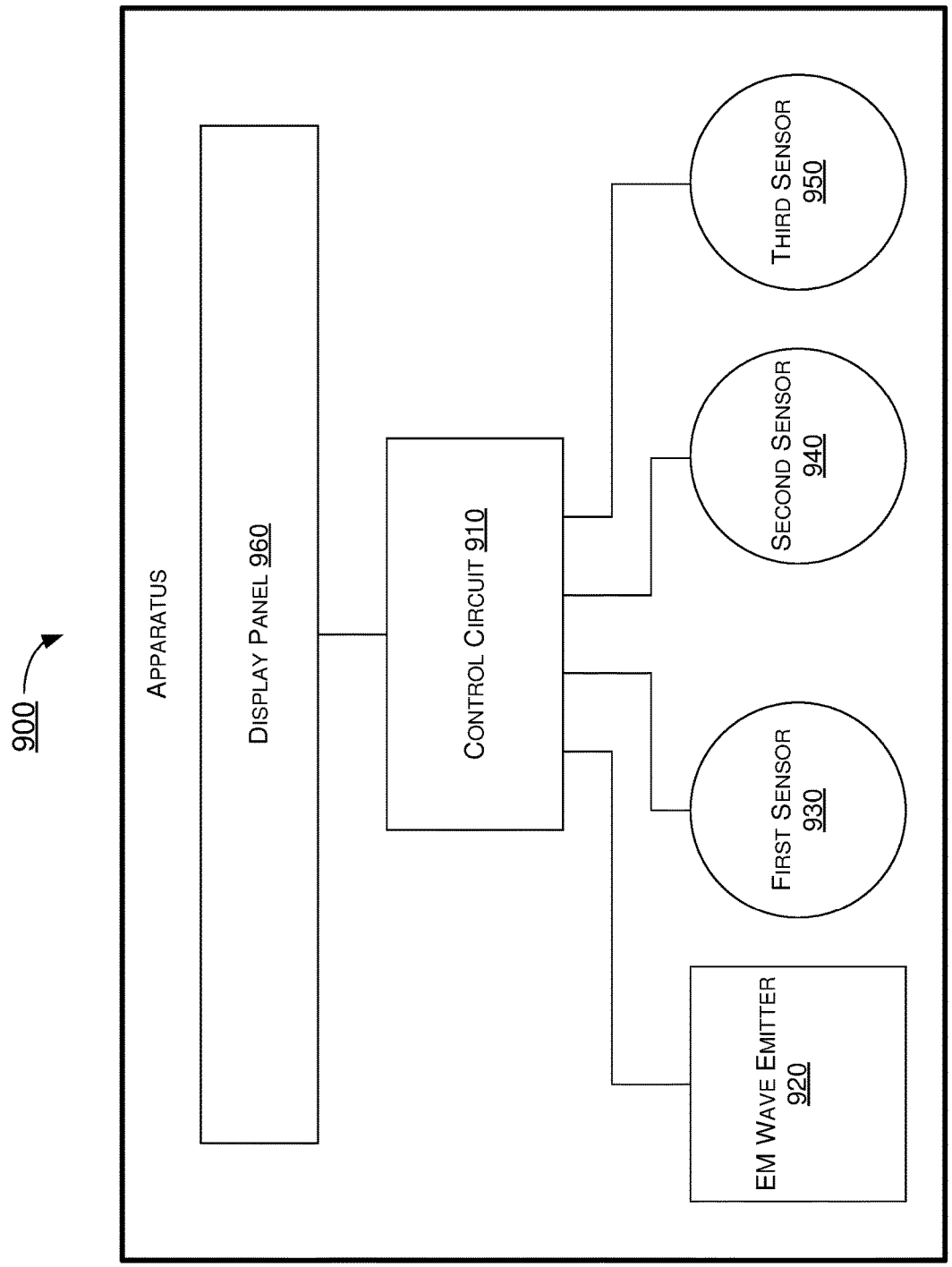
FIG. 9 is a diagram of an example apparatus in accordance with an implementation of the present disclosure.

FIG. 9 illustrates an example apparatus 900 in accordance with an implementation of the present disclosure. Apparatus 900 may perform various functions to implement procedures, schemes, techniques, processes and methods described herein pertaining to active stereo vision, including the various procedures, scenarios, schemes, solutions, concepts and techniques described above with respect to FIG. 1~FIG. 8 as well as process 1000 described below.

Apparatus 900 may be a part of an electronic apparatus, a portable or mobile apparatus, a wearable apparatus, a wireless communication apparatus or a computing apparatus. For instance, apparatus 900 may be implemented in a smartphone, a smartwatch, a personal digital assistant, a digital camera, or a computing equipment such as a tablet computer, a laptop computer or a notebook computer. Moreover, apparatus 900 may also be a part of a machine type apparatus, which may be an IoT or NB-IoT apparatus such as an immobile or a stationary apparatus, a home apparatus, a wire communication apparatus or a computing apparatus. For instance, apparatus 900 may be implemented in a smart thermostat, a smart fridge, a smart door lock, a wireless speaker or a home control center. Alternatively, apparatus 900 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Apparatus 900 may include at least some of those components shown in FIG. 9 such as a control circuit 910, at least one EM wave projector 920, a first sensor 930 and a second sensor 940. Optionally, apparatus 900 may also include a third sensor 950 and/or a display panel 960. Apparatus 900 may further include one or more other components not pertinent to the proposed scheme of the present disclosure (e.g., internal power supply, memory device and/or user interface device), and, thus, such component(s) of apparatus 900 are neither shown in FIG. 9 nor described below in the interest of simplicity and brevity.

In one aspect, control circuit 910 may be implemented in the form of an electronic circuit comprising various electronic components. Alternatively, control circuit 910 may be implemented as part of or in the form of one or more single-core processors, one or more multi-core processors, one or more RISC processors, or one or more CISC processors. That is, even though a singular term "a processor" is used herein to refer to control circuit 910, control circuit 910 may include multiple processors in some implementations and a single processor in other implementations in accordance with the present disclosure. In another aspect, apparatus 910 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, control circuit 910 is a special-purpose machine specifically designed, arranged and configured to perform specific tasks pertaining to active stereo vision in accordance with various implementations of the present disclosure. In some implementations, control circuit 910 may include an electronic circuit with hardware components implementing one or more of the various proposed schemes in accordance with the present disclosure. Alternatively, other than hardware components, control circuit 910 may also utilize software codes and/or instructions in addition to hardware components to implement active stereo vision in accordance with various implementations of the present disclosure.

Under various proposed schemes in accordance with the present disclosure, during operation, EM wave emitter 920 may emit EM waves toward a scene, first sensor 930 may capture a first image of the scene in an IR spectrum, and second sensor 940 may capture a second image of the scene in a light spectrum (e.g., IR spectrum or IR spectrum plus visible spectrum). The first image and second image, when processed by control circuit 910, may enable active stereo vision.

In some implementations, EM wave emitter 920 may include an IR projector which projects a structured IR light during operation. In such cases, first sensor 930 may include an IR camera. Additionally, second sensor 940 may include a RGB camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through.

In some implementations, EM wave emitter 920 may include an IR projector which projects a structured IR light during operation. In such cases, each of first sensor 930 and second sensor 940 may respectively include an IR camera, a RGB camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through.

In some implementations, apparatus 900 may include third sensor 950 which, during operation, may capture a third image of the scene in the IR spectrum. In such cases, EM wave emitter 920 may include an IR projector which projects a structured IR light during operation, first sensor 930 may include a first IR camera, second sensor 940 may include a RGB camera, and third sensor 950 may include a second IR camera. Moreover, first sensor 930 and second sensor 940 may be physically adjacent to one another.

In some implementations, apparatus 900 may include third sensor 950 which, during operation, may capture a third image of the scene in the IR spectrum. In such cases, EM wave emitter 920 may include an IR projector which projects a structured IR light during operation. Additionally, first sensor 930 may include a first IR camera, a first RGB camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through. Moreover, second sensor 940 may include a second RGB camera, and third sensor 950 may include a second IR camera. Furthermore, first sensor 930 and second sensor 940 may be physically adjacent to one another.

In some implementations, apparatus 900 may include third sensor 950 which, during operation, may capture a third image of the scene in the IR spectrum. In such cases, EM wave emitter 920 may include an IR projector which projects a structured IR light during operation, first sensor 930 may include a first IR camera, second sensor 940 may include a first RGB camera. Moreover, third sensor 950 may include a second IR camera, a second RGB camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through. Furthermore, first sensor 930 and second sensor 940 may be physically adjacent to one another.

In some implementations, apparatus 900 may include third sensor 950 which, during operation, may capture a third image of the scene in the IR spectrum. In such cases, EM wave emitter 920 may include an IR projector which projects a structured IR light during operation. Additionally, first sensor 930 may include a first IR camera, a first RGB camera containing one or more pixels capable of receiving light in the IR spectrum, a first monochrome camera containing one or more pixels capable of receiving light in the IR spectrum, a first RGB camera with dual-band bandpass filtering to allow light in the visible spectrum and the IR spectrum to pass through, or a first monochrome camera with dual-band bandpass filtering to allow light in the visible spectrum and the IR spectrum to pass through. Moreover, second sensor 940 may include a second RGB camera. Furthermore, third sensor 950 may include a second IR camera, a second RGB camera containing one or more pixels capable of receiving light in the IR spectrum, a second monochrome camera containing one or more pixels capable of receiving light in the IR spectrum, a second RGB camera with dual-band bandpass filtering to allow light in the visible spectrum and the IR spectrum to pass through, or a second monochrome camera with dual-band bandpass filtering to allow light in the visible spectrum and the IR spectrum to pass through. Here, first sensor 930 and second sensor 940 may be physically adjacent to one another.

In some implementations, EM wave emitter 920 may include an IR projector and a LED. In such cases, the IR projector may project a structured IR light during operation, and the LED may emit a floodlight during operation.

In some implementations, EM wave emitter 920 may include an IR projector and a ring-shaped IR light. In such cases, the IR projector may project a structured IR light during operation. The ring-shaped IR light may surround the IR projector, the first sensor and the second sensor. Additionally, the ring-shaped IR light may emit a floodlight (e.g., IR floodlight) during operation.

In some implementations, apparatus 900 may also include display panel 960 which emits a floodlight (e.g., IR floodlight) during operation. In such cases, EM wave emitter 920 may include an IR projector which projects a structured IR light during operation.

In some implementations, display panel 960 may include a liquid crystal display (LCD). In such cases, EM wave emitter 920, first sensor 930 and second sensor 940 may be disposed under a display surface of the LCD. During operation, EM wave emitter 920 may emit the structured IR light and first sensor 930 and second sensor 940 may capture the first image and the second image, respectively, when the display surface of the LCD is transparent.

In some other embodiments, one or more of EM wave emitter 920, first sensor 930 and second sensor 940 may be disposed on or above the display surface of display panel 960. Alternatively, one or more of EM wave emitter 920, first sensor 930 and second sensor 940 may be embedded in display panel 960.

Illustrative Processes

Figure 10:
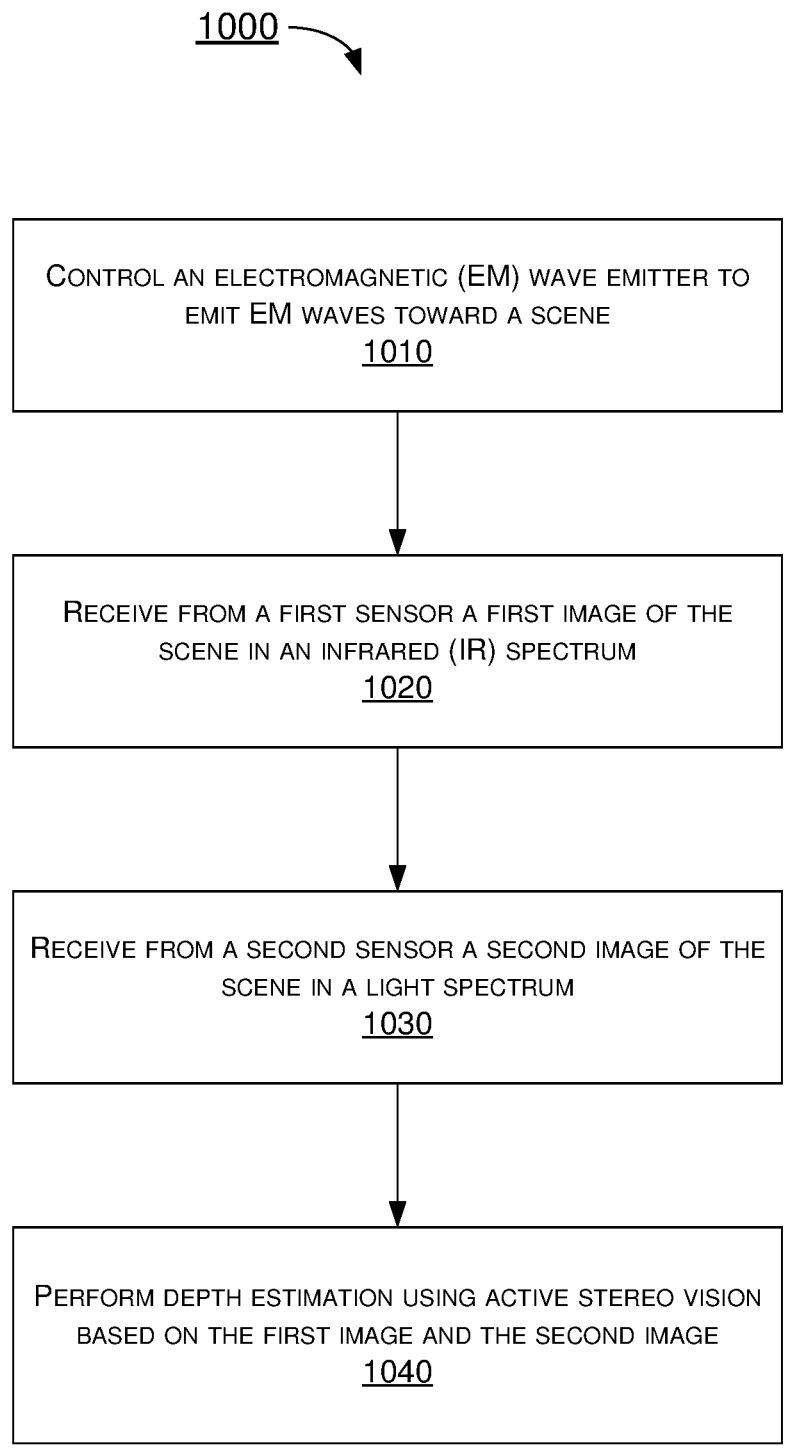
FIG. 10 is a flowchart of an example process in accordance with an implementation of the present disclosure.

FIG. 10 illustrates an example process 1000 in accordance with an implementation of the present disclosure. Process 1000 may be an example implementation of the various procedures, scenarios, schemes, solutions, concepts and techniques, or a combination thereof, whether partially or completely, with respect to active stereo vision in accordance with the present disclosure. Process 1000 may represent an aspect of implementation of features of apparatus 900. Process 1000 may include one or more operations, actions, or functions as illustrated by one or more of blocks 1010, 1020, 1030 and 1040. Although illustrated as discrete blocks, various blocks of process 1000 may be divided into additional blocks, combined into fewer blocks, or eliminated, depending on the desired implementation. Moreover, the blocks of process 1000 may executed in the order shown in FIG. 10 or, alternatively, in a different order. Furthermore, one or more of the blocks of process 1000 may be repeated one or more times. Process 1000 may be implemented by apparatus 900 or any variation thereof. Solely for illustrative purposes and without limitation, process 1000 is described below in the context of apparatus 900. Process 1000 may begin at block 1010.

At 1010, process 1000 may involve control circuit 910 controlling at least one EM wave emitter 920 to emit EM waves toward a scene. Process 1000 may proceed from 1010 to 1020.

At 1020, process 1000 may involve control circuit 910 receiving from first sensor 930 a first image of the scene in an IR spectrum. Process 1000 may proceed from 1020 to 1030.

At 1030, process 1000 may involve control circuit 910 receiving from second sensor 940 a second image of the scene in a light spectrum (e.g., IR spectrum or IR spectrum plus visible spectrum). Process 1000 may proceed from 1030 to 1040.

At 1040, process 1000 may involve control circuit 910 performing depth estimation using active stereo vision based on the first image and the second image.

In some implementations, the at least one EM wave emitter 920 may include an IR projector which projects a structured IR light during operation. Moreover, second sensor 940 may include a RGB-IR camera, a mono-IR camera, a RGB-DB camera, or a mono-DB camera.

In some implementations, process 1000 may also involve control circuit 910 receiving from third sensor 950 a third image of the scene in the IR spectrum. In such cases, the at least one EM wave emitter 920 may include an IR projector which projects a structured IR light during operation, first sensor 930 may include a first IR camera, second sensor 940 may include a RGB camera, and third sensor 950 may include a second IR camera. Moreover, first sensor 930 and second sensor 940 may be physically adjacent to one another.

In some implementations, process 1000 may also involve control circuit 910 receiving from third sensor 950 a third image of the scene in the IR spectrum. In such cases, the at least one EM wave emitter 920 may include an IR projector which projects a structured IR light during operation. Additionally, first sensor 930 may include a first IR camera, a first RGB-IR camera, a mono-IR camera, a RGB-DB camera, or a mono-DB camera. Moreover, second sensor 940 may include a second RGB camera, and third sensor 950 may include a second IR camera. Furthermore, first sensor 930 and second sensor 940 may be physically adjacent to one another.

In some implementations, process 1000 may also involve control circuit 910 receiving from third sensor 950 a third image of the scene in the IR spectrum. In such cases, the at least one EM wave emitter 920 may include an IR projector which projects a structured IR light during operation, first sensor 930 may include a first IR camera, second sensor 940 may include a first RGB camera, and third sensor 950 may include a second IR camera, a second RGB-IR camera, a mono-IR camera, a RGB-DB camera, or a mono-DB camera. Additionally, first sensor 930 and second sensor 940 may be physically adjacent to one another.

In some implementations, process 1000 may also involve control circuit 910 receiving from third sensor 950 a third image of the scene in the IR spectrum. In such cases, the at least one EM wave emitter 920 may include an IR projector which projects a structured IR light during operation. Additionally, first sensor 930 may include a first IR camera, a first RGB-IR camera, a first mono-IR camera, a first RGB-DB camera, or a first mono-DB camera. Moreover, second sensor 940 may include a second RGB camera. Furthermore, third sensor 950 may include a second IR camera, a second RGB-IR camera, a second mono-IR camera, a second RGB-DB camera, or a second mono-DB camera. Additionally, first sensor 930 and second sensor 940 may be physically adjacent to one another.

In some implementations, the at least one EM wave emitter 920 may include an IR projector and a LED. In such cases, the IR projector may project a structured IR light during operation, and the LED may emit a floodlight during operation.

In some implementations, the at least one EM wave emitter 920 may include an IR projector and a ring-shaped IR light. In such cases, the IR projector may project a structured IR light during operation. Moreover, the ring-shaped IR light may surround the IR projector, the first sensor and the second sensor, and the ring-shaped IR light may emit a floodlight during operation.

In some implementations, process 1000 may also involve control circuit 910 controlling display panel 960 to emit a floodlight. In such cases, EM wave emitter 920 may include an IR projector which projects a structured IR light during operation, and display panel 960 may include a liquid crystal display (LCD). In some implementations, the at least one EM wave emitter 920, first sensor 930 and second sensor 940 may be disposed under a display surface of the LCD. Moreover, during operation, the at least one EM wave emitter 920 may emit the structured IR light and first sensor 930 and second sensor 940 may capture the first image and the second image, respectively, when the display surface of the LCD is transparent.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An apparatus, comprising:
    an electromagnetic (EM) wave emitter which, during operation, emits EM waves toward a scene;
    a first sensor which, during operation, captures a first image of the scene in an infrared (IR) spectrum; and
    a second sensor which, during operation, captures a second image of the scene in a light spectrum,
    wherein the first image and second image, when processed, enable active stereo vision,
    wherein the EM wave emitter comprises an IR projector which projects a structured IR light during operation, and
    wherein each of the first sensor and the second sensor respectively comprises an IR camera, a red-green-blue (RGB) camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through.

2. The apparatus of claim 1, further comprising:
    a third sensor which, during operation, captures a third image of the scene in the IR spectrum,
    wherein the EM wave emitter comprises an IR projector which projects a structured IR light during operation,
    wherein the first sensor comprises a first IR camera,
    wherein the second sensor comprises a RGB camera,
    wherein the third sensor comprises a second IR camera, and
    wherein the first sensor and the second sensor are physically adjacent to one another.

3. The apparatus of claim 1, further comprising:
    a third sensor which, during operation, captures a third image of the scene in the IR spectrum,
    wherein the EM wave emitter comprises an IR projector which projects a structured IR light during operation,
    wherein the first sensor comprises a first IR camera, a first RGB camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through,
    wherein the second sensor comprises a second RGB camera,
    wherein the third sensor comprises a second IR camera, and
    wherein the first sensor and the second sensor are physically adjacent to one another.

4. The apparatus of claim 1, further comprising:
    a third sensor which, during operation, captures a third image of the scene in the IR spectrum,
    wherein the EM wave emitter comprises an IR projector which projects a structured IR light during operation,
    wherein the first sensor comprises a first IR camera,
    wherein the second sensor comprises a first RGB camera,
    wherein the third sensor comprises a second IR camera, a second RGB camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through, and
    wherein the first sensor and the second sensor are physically adjacent to one another.

5. The apparatus of claim 1, further comprising:
    a third sensor which, during operation, captures a third image of the scene in the IR spectrum,
    wherein the EM wave emitter comprises an IR projector which projects a structured IR light during operation,
    wherein the first sensor comprises a first IR camera, a first RGB camera containing one or more pixels capable of receiving light in the IR spectrum, a first monochrome camera containing one or more pixels capable of receiving light in the IR spectrum, a first RGB camera with dual-band bandpass filtering to allow light in the visible spectrum and the IR spectrum to pass through, or a first monochrome camera with dual-band bandpass filtering to allow light in the visible spectrum and the IR spectrum to pass through,
    wherein the second sensor comprises a second RGB camera,
    wherein the third sensor comprises a second IR camera, a second RGB camera containing one or more pixels capable of receiving light in the IR spectrum, a second monochrome camera containing one or more pixels capable of receiving light in the IR spectrum, a second RGB camera with dual-band bandpass filtering to allow light in the visible spectrum and the IR spectrum to pass through, or a second monochrome camera with dual-band bandpass filtering to allow light in the visible spectrum and the IR spectrum to pass through, and
    wherein the first sensor and the second sensor are physically adjacent to one another.

6. The apparatus of claim 1, wherein the EM wave emitter further comprises a light-emitting diode (LED), and wherein the LED emits a floodlight during operation.

7. The apparatus of claim 1, wherein the EM wave emitter further comprises a ring-shaped IR light, wherein the ring-shaped IR light surrounds the IR projector, the first sensor and the second sensor, and wherein the ring-shaped IR light emits a floodlight during operation.

8. The apparatus of claim 1, further comprising:
    a display panel which emits a floodlight during operation, wherein the EM wave emitter comprises an IR projector which projects a structured IR light during operation.

9. The apparatus of claim 8, wherein the display panel comprises a liquid crystal display (LCD), wherein the EM wave emitter, the first sensor and the second sensor are disposed under a display surface of the LCD, and wherein, during operation, the EM wave emitter emits the structured IR light and the first sensor and the second sensor capture the first image and the second image, respectively, when the display surface of the LCD is transparent.

10. A method, comprising:
controlling an electromagnetic (EM) wave emitter to emit EM waves toward a scene;
receiving from a first sensor a first image of the scene in an infrared (IR) spectrum;
receiving from a second sensor a second image of the scene in a light spectrum; and
performing depth estimation using active stereo vision based on the first image and the second image,
wherein the EM wave emitter comprises an IR projector which projects a structured IR light during operation, and
wherein the second sensor comprises a red-green-blue (RGB) camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through.

11. The method of claim 10, further comprising:
receiving from a third sensor a third image of the scene in the IR spectrum,
wherein the EM wave emitter comprises an IR projector which projects a structured IR light during operation,
wherein the first sensor comprises a first IR camera,
wherein the second sensor comprises a RGB camera,
wherein the third sensor comprises a second IR camera, and
wherein the first sensor and the second sensor are physically adjacent to one another.

12. The method of claim 10, further comprising:
receiving from a third sensor a third image of the scene in the IR spectrum,
wherein the EM wave emitter comprises an IR projector which projects a structured IR light during operation,
wherein the first sensor comprises a first IR camera, a first RGB camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through,
wherein the second sensor comprises a second RGB camera,
wherein the third sensor comprises a second IR camera, and
wherein the first sensor and the second sensor are physically adjacent to one another.

13. The method of claim 10, further comprising:
receiving from a third sensor a third image of the scene in the IR spectrum,
wherein the EM wave emitter comprises an IR projector which projects a structured IR light during operation,
wherein the first sensor comprises a first IR camera,
wherein the second sensor comprises a first RGB camera,
wherein the third sensor comprises a second IR camera, a second RGB camera containing one or more pixels capable of receiving light in the IR spectrum, a monochrome camera containing one or more pixels capable of receiving light in the IR spectrum, a RGB camera with dual-band bandpass filtering to allow light in the visible spectrum and the IR spectrum to pass through, or a monochrome camera with dual-band bandpass filtering to allow light in the visible spectrum and the IR spectrum to pass through, and
wherein the first sensor and the second sensor are physically adjacent to one another.

14. The method of claim 10, further comprising:
receiving from a third sensor a third image of the scene in the IR spectrum,
wherein the EM wave emitter comprises an IR projector which projects a structured IR light during operation,
wherein the first sensor comprises a first IR camera, a first RGB camera containing one or more pixels capable of receiving light in the IR spectrum, a first monochrome camera containing one or more pixels capable of receiving light in the IR spectrum, a first RGB camera with dual-band bandpass filtering to allow light in the visible spectrum and the IR spectrum to pass through, or a first monochrome camera with dual-band bandpass filtering to allow light in the visible spectrum and the IR spectrum to pass through,
wherein the second sensor comprises a second RGB camera,
wherein the third sensor comprises a second IR camera, a second RGB camera containing one or more pixels capable of receiving light in the IR spectrum, a second monochrome camera containing one or more pixels capable of receiving light in the IR spectrum, a second RGB camera with dual-band bandpass filtering to allow light in the visible spectrum and the IR spectrum to pass through, or a second monochrome camera with dual-band bandpass filtering to allow light in the visible spectrum and the IR spectrum to pass through, and
wherein the first sensor and the second sensor are physically adjacent to one another.

15. The method of claim 10, wherein the EM wave emitter comprises an IR projector and a light-emitting diode (LED), wherein the IR projector projects a structured IR light during operation, and wherein the LED emits a floodlight during operation.

16. The method of claim 10, wherein the EM wave emitter comprises an IR projector and a ring-shaped IR light, wherein the IR projector projects a structured IR light during operation, wherein the ring-shaped IR light surrounds the IR projector, the first sensor and the second sensor, and wherein the ring-shaped IR light emits a floodlight during operation.

17. The method of claim 10, further comprising:
controlling a display panel to emit a floodlight,
wherein the EM wave emitter comprises an IR projector which projects a structured IR light during operation,
wherein the display panel comprises a liquid crystal display (LCD),
wherein the EM wave emitter, the first sensor and the second sensor are disposed under a display surface of the LCD, and
wherein, during operation, the EM wave emitter emits the structured IR light and the first sensor and the second sensor capture the first image and the second image, respectively, when the display surface of the LCD is transparent.

* * * * *